US005120947A

United States Patent [19]

Petch et al.

[11] Patent Number: 5,120,947

[45] Date of Patent: Jun. 9, 1992

[54] APPARATUS AND METHOD FOR PROCESSING A TICKET

[75] Inventors: David B. Petch; James L. Cunning, both of San Diego, Calif.

[73] Assignee: International Totalizator Systems, Inc., Carlsbad, Calif.

[21] Appl. No.: 501,533

[22] Filed: Mar. 29, 1990

[51] Int. Cl.[5] .................... G06K 13/04; G06K 13/077

[52] U.S. Cl. .................................... 235/475; 235/432; 235/476; 235/480

[58] Field of Search ............... 235/432, 475, 476, 477, 235/480, 483, 481; 271/275, 902

[56] References Cited

U.S. PATENT DOCUMENTS

| | | | |
|---|---|---|---|
| 3,114,150 | 12/1963 | Calano et al. | 235/483 |
| 3,432,646 | 3/1969 | Perry | 235/483 |
| 4,112,470 | 9/1978 | Yamauchi | 235/483 |
| 4,164,649 | 8/1979 | Anderegg et al. | 235/480 |
| 4,613,747 | 9/1986 | McCarthy | 235/477 |
| 4,659,037 | 4/1987 | Leonard | 271/3 |
| 4,677,553 | 6/1987 | Roberts | 364/412 |
| 4,704,518 | 11/1987 | Brunn et al. | 235/480 |
| 4,965,438 | 10/1990 | Murofushi | 235/432 |

OTHER PUBLICATIONS

Intelligent Printing Workstations, Product Brochure for Model IER 457 ATB Thermal Transfer ATB Check-In-Printer.

Intelligent Printing Workstations, Product Borchure for Model IER 467 Thermal Transfer ATB Ticket Printer.

Intelligent Printing Workstations, Product Brochure for Model IER 617 ATB Boarding Gate Reader.

*Primary Examiner*—Robert Weinhardt

*Attorney, Agent, or Firm*—Baker, Maxham, Jester & Meador

[57] ABSTRACT

An apparatus for processing a ticket includes a circular ticket guide having a drive apparatus for driving a ticket in the circular ticket guide, an arcuate ticket guide having a ticket drive apparatus for driving a ticket in the arcuate ticket guide, a ticket transfer guide extending tangentially between the circular and arcuate ticket guides for transferring a ticket between the circular and arcuate ticket guides, at least one ticket input guide extending tangentially into the circular ticket guide for inputting a ticket into the circular ticket guide from an associated ticket input area, a ticket output guide for outputting a ticket from the arcuate ticket guide to an associated ticket output area, ticket writing and reading mechanisms for writing and reading information on a ticket and a ticket printer for printing information on a ticket.

28 Claims, 2 Drawing Sheets

APPARATUS AND METHOD FOR PROCESSING A TICKET

BACKGROUND OF THE INVENTION

The field of the present invention is automated ticket processing apparatus, and more particularly, apparatus for printing and/or validating tickets used by commercial airlines and the like.

Ticket processing mechanisms have been used in a variety of applications. For example, apparatus for gaming include ticket terminals for moving a ticket through various stages of issue processing. The DM-4D Data Mark ticket issuing terminal, manufactured and sold by the assignee of this patent application, includes a ticket advancing mechanism having a pair of spaced-apart, parallel ticket rollers which move a ticket in a figure-eight configuration for processing on both sides of the ticket. By processing is meant reading, writing or printing information on one or more faces of a ticket. The ticket advancing mechanism of another Data Mark terminal can be understood by reference to U.S. Pat. No. 4,677,553, which is assigned to the assignee of the subject patent application and incorporated herein by reference. A still further ticket advancing mechanism for moving a ticket through various stages of processing in a single circular ticket guide is taught in U.S. Pat. No. 4,704,518, which is also assigned to the assignee of the subject patent application and incorporated herein by reference.

Other mechanisms for processing documents such as tickets are exemplified in apparatus which propel a ticket along an essentially linear pathway which is branched near its terminal to provide separate channels for issuing or impounding a ticket. Such branching is represented by U.S. Pat. No. 4,164,649. Ticket issuing apparatus used for printing and/or validating commercial air carrier tickets and itinerary have been of this sort. In general, such ticket processing equipment requires the provision of a linear ticket path, branches in the path, and a sequence of reciprocating mechanisms distributed along the path to propel a ticket through the path and into any of its branches. It will be appreciated that such an architecture results in an elongated ticket processing apparatus which occupies an amount of space proportional to the length of the path. Further, the plethora of driving mechanisms requires a complex electro-mechanical control mechanization to orchestrate the operations of the driving mechanisms.

An effort to minimize ticket processing path length in a ticket processing terminal is represented by the DM-4 Data Mark terminal of the assignee. The DM-4 terminal is especially significant in that the figure-eight ticket pathway permits processing on both sides of a ticket in a relatively compact configuration. Another effort to minimize ticket processing path length in a ticket processing terminal is represented by the above-mentioned U.S. Pat. No., 4,704,518.

These ticket processing terminals are adequate for their respective purposes, but may not be optimal where it is required to write information to, read information from and print information to a ticket as part of a revalidation and/or ticket issuing process as practiced by commercial airlines.

Commercial air carriers may also be expected to use coded ticket stock to prevent fabrication of counterfeit tickets. Each ticket will have a stock control number encoded thereon which a ticket processing apparatus will read and send to an airline computerized reservation system. This will require an additional ticket reading step and a lengthening of ticket processing time depending on the configuration of the ticket path. Minimum path length and rapid ticket throughput will thus become even more important.

Therefore, there is an evident need for a ticket issuing and validation apparatus with a configuration which minimizes the space required for movement of a ticket undergoing processing, yet which permits the apparatus to effectively read, write and print information on a ticket pursuant to a ticket validation and/or issuing process.

It is therefore an object of the present invention to provide a compact, yet multifunctional, ticket issuing and validation apparatus.

SUMMARY OF THE INVENTION

The invention is expressed in structural form as an apparatus for processing tickets. The apparatus includes a circular ticket guide, a drive mechanism for driving a ticket in the circular ticket guide in a forward or reverse direction, an arcuate ticket guide, an arcuate ticket guide drive mechanism for driving a ticket in the arcuate ticket guide, a ticket transfer guide extending between the circular and arcuate ticket guides for transferring a ticket between the circular and arcuate ticket guides, at least one ticket input guide extending to the circular ticket guide for inputting a ticket into the circular ticket guide from a ticket input area, a ticket output guide for outputting a ticket from the arcuate ticket guide to a ticket output area and ticket reading, writing and printing mechanisms.

This structure supports a method for printing, validating and issuing tickets which includes the steps of feeding and introducing a ticket into the circular ticket guide, driving the ticket around the circular ticket guide in a forward direction, writing information to and/or reading information from the ticket while the ticket is being driven in the forward direction in the circular ticket guide, driving the ticket in a reverse direction while diverting the ticket from the circular ticket guide at a selected diverting point in the circular ticket guide depending on whether a validation or ticket issuing process is being performed. If a revalidation process is being performed, the ticket is diverted to a ticket return area if the ticket does not need to be altered. If the ticket undergoing validation contains erroneous information or if a ticket is to be issued, the ticket is diverted from the circular ticket guide to the arcuate ticket guide where the ticket is printed and subsequently issued to a ticket output area.

It will be evident that the above-stated objectives are achieved, together with other attendant advantages, when the following detailed description is read in conjunction with the below-described drawings.

DETAILED DESCRIPTION OF THE PREFERRED EMBODIMENT

Figure 1:
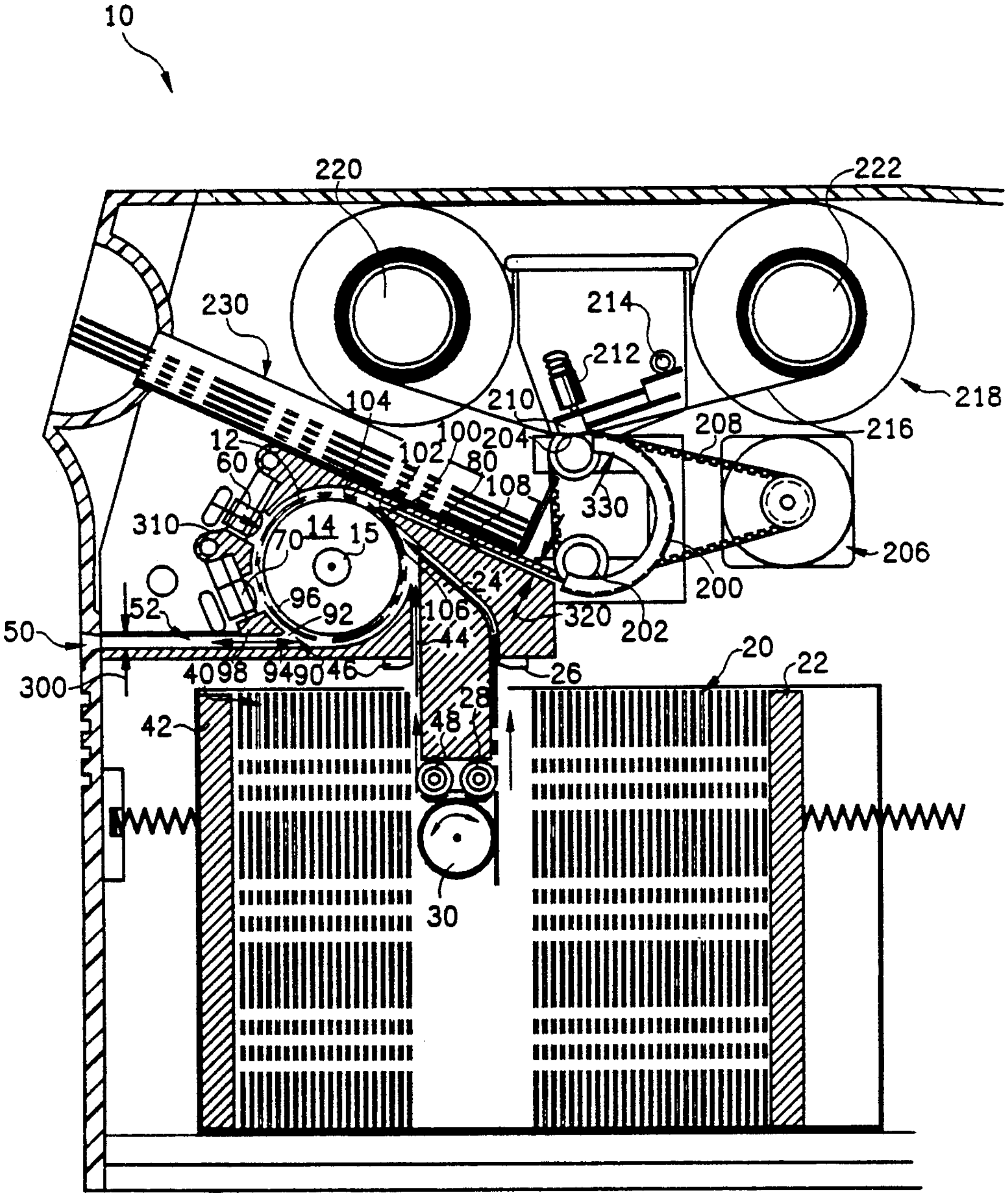
FIG. 1 is a side elevation view of a ticket validation and issuing, device constructed in accordance with the present invention.

Referring now to FIG. 1 for an understanding of the overall structure and major mechanisms in a ticket validation and issuing device constructed in accordance with the present invention, the device is intended for use in a ticket processing system into which it would be integrated with other functional components to perform general ticket processing transactions. For example, the device of the invention could operate at an airline ticket counter or at a remote location such as a travel agency. In both cases, the device would communicate with a central airline reservation data processing system for obtaining ticketing information. The device or apparatus for validating and issuing tickets includes a housing 10 defining or containing an endless cylindrical ticket guide 12. The ticket guide 12 is formed by the interior surface of a hollow cylinder in the housing 10. A ticket is advanced along a revolutionary path around the ticket guide 12 in a feeding direction, which in the preferred embodiment corresponds to the counter-clockwise direction in FIG. 1. The force for driving a ticket in the circular path of the ticket guide 12 is provided by a rotating drive cylinder 14. A drive cylinder 14 rotates on a conventional shaft to which it is detachably connected by a releasable, shaft-engaging mechanism of conventional design. The drive cylinder 14 is powered by a DC gear motor 15 which may be selectively operated in a forward or reverse direction, thereby providing the capability of rotating the cylinder 14 in a clockwise direction or a counterclockwise direction with respect to the orientation of FIG. 1.

The housing 10 further includes a plurality of ticket sources. A first ticket magazine 20 supports a plurality of tickets stacked on edge and retained in a pack configuration by a biased ticket retainer 22. The tickets in the magazine 20 are fed into the ticket guide 12 through a feeding aperture 24 which extends tangentially to the circular ticket guide 12 from a knife 26 which is positioned to limit the number of tickets in the passage 24 to one ticket. Tickets from the magazine 20 are driven past the knife 26 into the passage 24 and into the circular ticket guide 12 by a feed roller 28 driven by a ticket feed motor 30 which is conventionally coupled to the feed roller 28 by a gear drive assembly. When the feed roller 28 is rotated in the counterclockwise direction, a ticket is fed through the feeding aperture 24 into the circular ticket guide 12. As the ticket advances into the circular guide, its flexibility will cause it to assume a partially curved configuration conforming to the curvature of the ticket guide 12. As the ticket advances into the circular ticket guide 12 from the feeding aperture 24, the drive cylinder 14 is rotated in the counter clockwise direction to drive the ticket in the guide in the feeding direction. The first ticket magazine may be used to hold blank airline ticket forms.

A second ticket magazine 40 contains a plurality of tickets stacked on edge and retained in a pack configuration by a biased ticket retainer 42. The tickets in the magazine 40 are fed into the circular ticket guide 12 through a feeding aperture 44 which extends tangentially to the circular ticket guide 12 from a ticket knife 46 positioned so as to limit the number of tickets in the feeding aperture 44 to one ticket. The tickets in the magazine 40 are fed into the circular ticket guide 12 through the feeding aperture 44 by means of a feed roller 48 driven by the ticket feed motor 30 which is conventionally coupled to the feed roller 48 by a gear drive assembly. When the feed roller 48 is rotated in the clockwise direction, a ticket is fed through the feeding aperture 44 into the circular ticket guide 12. As the ticket advances into the circular guide, its flexibility will cause it to assume a partially curved configuration conforming to the curvature of the circular ticket guide 12. As the ticket advances into the circular ticket guide 12 through the feeding aperture 44, the drive cylinder 14 is rotated in the counter clockwise direction to drive the ticket in the guide in the feeding direction. The second ticket magazine 40 may be used to hold blank airline itinerary forms.

A third ticket source includes a ticket revalidation input 50 in communication with the circular ticket guide 12 through a ticket input guide 52 extending tangentially to the circular ticket guide 12 from the revalidation input 50. The revalidation input 50 is positioned such that a ticket may be inserted through the ticket guide 52 until it enters the circular ticket guide 12 and engages the drive cylinder 14. The drive cylinder 14, when rotating in the counter clockwise feeding direction, will feed the ticket from the ticket guide 52 into the circular ticket guide 12, whereupon the flexibility of the ticket will cause it to assume a partially curved configuration conforming to the curvature of the ticket guide 12.

Advancing arcuately in the forward direction from the ticket input guide 52, the feeding aperture 44 and the feeding aperture 24, there is provided a magnetic ticket writing mechanism 60 and a magnetic ticket reading mechanism 70 displaced arcuately beyond said ticket writing mechanism in the ticket feeding direction. The ticket writing and ticket reading mechanisms are of conventional construction and are electrically connected to an information processing apparatus, described hereinafter. The ticket writing and reading mechanisms are positioned adjacent to the circular ticket guide so as to respectively write and read magnetic information on a magnetic strip disposed on a ticket.

Arcuately, disposed between the feeding aperture 24 and the writing mechanism 60 is a ticket transfer guide 80 which extends tangentially between the circular ticket guide 12 and an arcuate ticket guide, to be described hereinafter.

Positioned adjacent the circular ticket guide 12 at the respective interfaces between the circular ticket guide 12 and the ticket input guide 52 and between the circular ticket guide 12 and the ticket transfer guide 80, are a ramped ticket return aperture 90 and a ramped ticket transfer aperture 100. The ramped apertures 90 and 100 are configured to divert a ticket from the circular ticket guide 12 when the ticket is driven in a reverse or clockwise direction, into the respective ticket guides 52 and 80. The ramped ticket return aperture 90 is formed from a ramped stationary edge 92 and a surface 94 which is tangential to the surface of the ticket guide 12. The ramped stationary edge 92 transitions to an arcuate surface 96 which forms a portion of the circular ticket guide 12. A rear surface 98, tangential to the ticket guide, and the arcuate surface 96 meet as an apex to form the ramped edge 92.

Similarly, the ramped ticket transfer aperture is formed between a ramped stationary edge 102 and a surface 104 which is tangential to the circular ticket guide 12. The ramped stationary edge 102 transitions to an arcuate surface 106 which forms a portion of the circular ticket guide 12. A rear surface 108, tangential to the circular ticket guide 12, and the arcuate surface 106 meet as an apex to form the ramped edge 102.

The ticket transfer guide 80 extends tangentially to an arcuate ticket guide 200 formed in the housing 10. The ticket guide 200 shown in FIG. 1 is formed by the interior surface of a generally semi-circular aperture in the housing 10 and extends from the ticket transfer guide 80 to a ticket output area. Disposed adjacent the arcuate ticket guide 200 at the beginning and end thereof is a drive roller and print platen 202 and 204, respectively. The drive roller and print platen are driven by a stepper motor 206 through a belt 208. The drive roller and print platen 202 and 204 are driven in the same forward direction as the drive cylinder 14 which in FIG. 1 is the counterclockwise direction.

Disposed adjacent the arcuate ticket guide 200 and opposite the print platen 204 is a pivotally mounted ticket print head mechanism ("printer") 210. The ticket printer 210 is brought into printing engagement with a ticket by a solenoid 212, which thrusts the printer 210 toward a ticket in the arcuate ticket guide 200. The printer 210 is pivoted at 214 so that the printing head and an associated platen are brought into contact with a ticket. The printer 210 is part of a conventional thermal transfer ribbon printing apparatus. A ribbon 216 is positioned between the printer 210 and a ticket to be printed. The ribbon 216 extends from a ribbon cartridge 218 which includes a take up spool 220 and a supply spool 222. The ribbon take up spool 220 is driven by a ribbon take up motor which takes up any ribbon slack between the printer 210 and the take up spool 220. The ribbon supply spool 222 is controlled by a ribbon brake which maintains ribbon tension between the ribbon supply spool 220 and the printer 210.

Thus, the print platen 204 drives a ticket in the arcuate ticket guide 200, and also drives the ribbon 216 during ticket printing. The printer solenoid 212 assists by biasing the printer 210 against the ribbon and ticket toward the drive roller 204. As the ticket is driven past the print platen 204 it is ejected into a ticket output bin 230.

The housing 10 further includes a plurality of ticket position sensors which provide ticket position information to the information processing apparatus, described hereinafter. A reflective-transmissive revalidation input sensor 300 is provided adjacent the ticket input guide 52 proximate to the revalidation input 50. The sensor includes a conventional light emitting diode and an opposing light sensitive detector. A reflective ticket-under-magnetic-head (TUM) sensor 310 is positioned adjacent the circular ticket guide 12, arcuately aligned with the ticket writing mechanism 60 in order to sense the condition of a ticket under the writing mechanism 60. The TUM sensor 310 is a reflective sensor having a conventional light emitting diode and a light sensitive detector aligned to receive light reflected by a ticket. A transition sensor 320 is provided adjacent the ticket transfer guide 80 proximate to the arcuate ticket guide 200 to sense the condition of a ticket entering the arcuate ticket guide 200 from the ticket transfer guide 80. The transition sensor 320 is a transmissive sensor which includes a conventional light emitting diode positioned on one side of the ticket transfer guide 80 from a conventional light sensitive detector which is positioned to receive light emitted from the light emitting diode. A ticket under print head (TUP) sensor 330 is provided adjacent the arcuate ticket guide 200 proximate to the print head 210 to sense the condition of a ticket approaching the print head. The TUP sensor 330 is an electro-mechanical sensor having a conventional light emitting diode and a light sensitive detector positioned such that a pivoting bracket, rotated by the ticket, moves a light blocking device in and out of the transmissive sensor.

Figure 2:
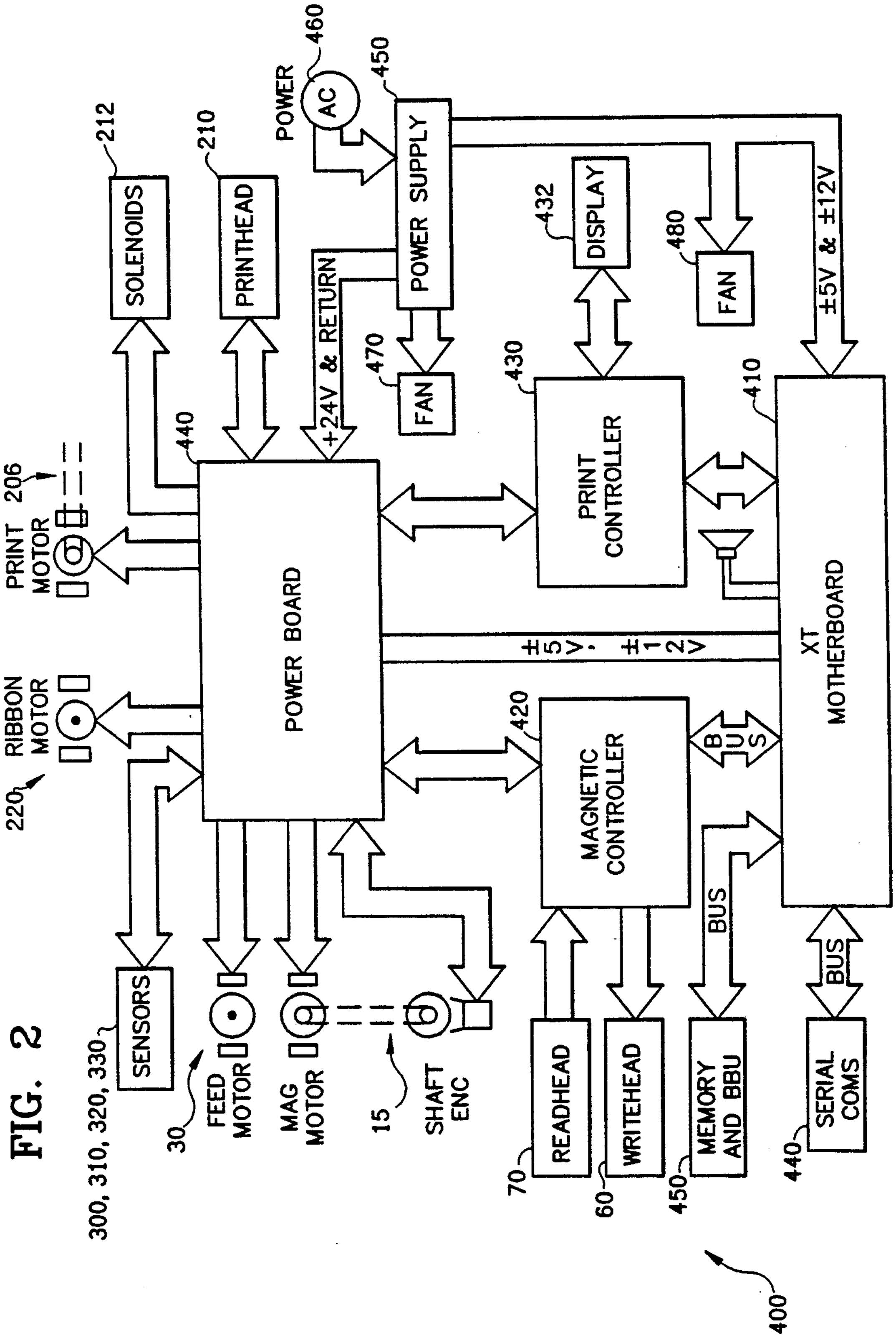
FIG. 2 is a block diagram of the electronics control mechanism which controls operation of the ticket validation and issuing device shown in FIG. 1.

Turning now to FIG. 2, a block diagram of the associated inputs and outputs are shown. Preferably, the apparatus 400 is mounted, using known means in the enclosure 10 and is connected conventionally to the sensor's, read heads, write heads, and motors illustrated in FIG. 1 and described above. The apparatus 400 is conventional and includes a programmable processor assembly 410 which conventionally includes a microprogrammable microprocessor, associated memory and an input-output data bus (I/O BUS). The processor 410 is connected through its I/O bus to a magnetic controller 420 and a print controller 430, and may also optionally be connected through the I/0 bus to a serial communication port 440 and additional memory 450.

The magnetic controller 420 is in electrical communication with the writing and reading mechanisms 60 and 70, and with the DC gear motor 15 which drives the drive cylinder 14. The print controller 430 is in electrical communication with a video display 432 of conventional design and with the stepper motor 206. Both the magnetic controller 420 and the print controller 430 are connected via the I/O bus to a power board 440 which powers the ticket position sensors 300, 310, 320 and 330, the ticket feed motor 30, the ribbon take up motor, the stepper motor 206, the solenoids 212 and the printer 210. The power board 440 also provides data input and output between the sensors 300, 310, 320 and 330, and the print head 210. A power supply 450, electrically powered from a conventional AC power source 460, provides a +24 volt potential to the power board 440 and +5v and +12v sources to the processor 410. The power supply 450 also powers cooling fans 470 and 480.

In the preferred embodiment, operations of the information processing apparatus 400 are controlled by a program conventionally entered in the processor assembly 410. The primary feature and functions of the program are set forth in the following pseudo code listing:

```
START:
    If no ticket request is active, then
        Go to START
    If ticket feed request is "feed from revalidation
    input slot," then
    WAIT FOR INPUT:
        If ticket in revalidation input slot sensor is
        off, then
            Go to WAIT FOR INPUT
    Turn on magnetic motor in counter-clockwise direction
    If ticket feed request is "feed from rear ticket bin,"
    then
        Turn on ticket feed motor in clockwise direction
    Else if ticket feed request is "feed from forward
    ticket bin," then
        Turn on ticket feed motor counter-clockwise
WAIT FOR TUM 1:
    If ticket under magnetic head (TUM) sensor is off, then
        Go to WAIT FOR TUM 1
    Turn off ticket bin feed motor
    If ticket function request is "read magnetic data,"
    then
        Read magnetic data until the TUM sensor is off
        Turn off magnetic motor
        Send magnetic data to main processor
        Accept updated ticket function request and
```

-continued

```
        magnetic data from main processor
        If ticket function request is "eject ticket," then
            Go to EJECT TICKET
        Turn on magnetic motor in counter-clockwise
        direction
        WAIT FOR TUM 2:
            If TUM sensor is off, then
                Go to WAIT FOR TUM 2
        If ticket function request is "write magnetic
        data," then
            Write magnetic data until the TUM sensor is
            off
            Read magnetic data and verify against data
            written
EJECT TICKET:
    If ticket eject location is "eject to printer," then
        Turn off magnetic motor
        Turn on magnetic motor in clockwise direction
        WAIT FOR TRANSITION:
            If magnetic to printer transition sensor is
            off, then
            Go to WAIT FOR TRANSITION
        WAIT FOR TUP 1:
            If ticket at printhead (TUP) sensor is on,
            then
        Turn off magnetic motor
        WAIT FOR TUP 2:
            If TUP sensor is on, then
                Go to WAIT FOR TUP 2
        Turn on magnetic motor in clockwise direction
        Turn on printer motor
        Turn on thermal transfer ribbon takeup motor
        Turn on thermal transfer ribbon brake
        Accept print data from main processor
        WAIT FOR TUP 3:
            If TUP sensor is off, then
                Go to WAIT FOR TUP 3
        Turn off magnetic motor
        Activate printhead pressure solenoid
        Release thermal transfer ribbon brake
        Format print data and transfer to printhead
        WAIT FOR TUP 4:
            If TUP sensor is on, then
                Go to WAIT FOR TUP 4
        Start ticket eject timer
        WAIT FOR EJECT:
            If ticket eject timer not expired, then
                Go to WAIT FOR EJECT
        Engage thermal transfer ribbon brake
        Deactivate printhead pressure solenoid
        Turn off printer motor
    Else if ticket eject location is "eject to input
    slot," then
        Rotate magnetic motor in counter-clockwise
        direction one quarter revolution
        Turn off magnetic motor
        Turn on magnetic motor in clockwise direction
        Rotate magnetic motor in clockwise direction
one     revolution
        Turn off magnetic motor
    Else
        Turn off magnetic motor
Go to START
```

From the above coding it will be appreciated that several ticketing and validation functions may be conveniently performed by the invention. The following examples illustrate such operations:

EXAMPLE 1

Ticket Revalidation

Following conventional power up and system testing, the information processing apparatus 400 continuously samples a user command interface such as a keyboard, for a ticket feed request. If the operator requests ticket revalidation, the processor waits for an input signal from the revalidation input sensor 300. When a signal from the revalidation input sensor is received, indicating that a ticket has been inserted in the revalidation input 50 into the ticket input guide 52, the processor activates the magnetic motor 15 to rotate the drive cylinder 14 in a counter-clockwise feeding direction. The processor then waits for a signal from the TUM sensor 310. When the processor receives a signal from the TUM sensor 310, indicating that the ticket is under the writing mechanism 60, the processor, having been selected to read magnetic data from the ticket, activates the reading mechanism 70 to read magnetic data from the ticket. When the TUM sensor 310 signals that the ticket is no longer under the writing mechanism 60, the processor waits sufficient time for drive cylinder 14 to advance the ticket until it is no longer under the reading mechanism 70. At that time, the processor signals the magnetic motor 15 to stop.

The information received from the reading mechanism 70 is processed, for example, by an airline reservation system computer. If the information on the ticket is correct and does not require updating, the processor enters an "Eject Ticket" mode. In this mode the processor tests to see whether an "Eject to Printer" or an "Eject to Input Slot" operation has been requested. In the revalidation mode, the processor is instructed to eject to the revalidation input slot 50. The processor signals the magnetic motor 15 1 to rotate in the counter-clockwise feeding direction ¼ revolution so as to drive the trailing edge of the ticket beyond the ramped return aperture 90. The processor then signals the magnetic motor 15 to stop and to begin rotating in the clockwise reverse direction. The magnetic motor 15 rotates in the clockwise reverse direction for one revolution, which is sufficient to drive the ticket through the ticket input guide 52 to the revalidation input 50, where it may be retrieved by the operator. The processor then turns off the magnetic motor 15.

If the ticket information read by the ticket reading mechanism 70 is incorrect and needs to be changed, the processor performs an "Eject to Printer" operation. The processor activates the magnetic motor 15 to turn in the clockwise reverse direction and waits for a transition signal from the transition sensor 320, indicating that the ticket has entered the ticket transfer guide 80 through the ramped ticket transfer aperture 100 and is approaching the arcuate ticket guide 200. When a signal from the transition sensor 320 is received by the processor, the processor tests the TUP sensor 330 to determine whether a previous ticket is still under the printer 210. If so, the magnetic motor 15 is deactivated. When no previous ticket is under the printer 210, the processor again activates the magnetic motor 15 to turn in the clockwise reverse direction. The processor also tests the TUM sensor 310 to see when the ticket is no longer under the writing mechanism 60. When the processor receives that signal from the sensor 310, the processor activates the printer motor 206 to turn the drive roller and print platen 202 and 204 in the counterclockwise feeding direction. The processor also activates the thermal transfer ribbon take up motor 220. The processor then tests the TUP sensor 330 to verify that the ticket has entered the printing area. If it has, the processor deactivates the magnetic motor 15, activates the printer pressure solenoid 212, releases the thermal transfer ribbon brake 222, formats the print data and transfers the data to the print head 210, where it is transferred to the ticket. The processor then tests the TUP sensor 330 to determine when the ticket has passed beyond the sensor. If it has, the processor starts a ticket eject timer and waits for expiration of the timer. Thereafter, the processor activates the thermal transfer ribbon brake, deactivates the printer pressure solenoid and turns off the printer motor.

EXAMPLE 2

Ticket Issuing

When the operator initiates a ticket issuing request, the processor activates the magnetic motor 15 to turn the drive cylinder 14 in the counter-clockwise feeding direction. The processor also activates the ticket feed motor 30 and causes it to drive the ticket feed roller 28 in a counter-clockwise feeding direction to drive a blank ticket past the knife 26, through the ticket input aperture 24 and into the circular ticket guide 12 where the magnetic motor 15 has been activated to drive the ticket in the counterclockwise feed direction. The processor tests the TUM sensor 310 to determine when the ticket has passed under the writing mechanism 60. When the TUM sensor 310 indicates that the ticket has reached the writing mechanism 60, the processor deactivates the ticket feed motor 30. The processor, which has been instructed to write magnetic data, activates the writing mechanism 60 to write magnetic data until the processor receives a signal from the TUM sensor 310 indicating that the trailing edge of the ticket has passed the writing mechanism 60. The processor then activates the ticket reading mechanism 70 to commence reading magnetic data from the ticket which by that time has been driven one revolution after the magnetic write step. If the information read from a ticket coincides with the information written to the ticket, the processor deactivates the magnetic motor 15 and reverses its direction to a clockwise reverse direction, whereby the ticket is driven into the ramped ticket transfer aperture 100. The processor then performs the "Eject to Printer" routine, discussed above.

EXAMPLE 3

Printing an Itinerary

When the processor is selected to print an itinerary it activates the magnetic motor 15, as described in Example 2 above, and activates the ticket feed motor 30 so as to drive the drive roller 48 in a clockwise feeding direction. The drive roller 48 drives an itinerary ticket past the knife 46, through the ticket input aperture 44, to the circular ticket guide 12 where the magnetic motor 15 has been activated to drive the ticket in the counter-clockwise feed direction. The ticket is driven in the feed direction until its trailing edge passes the TUM sensor 310. The processor then deactivates the magnetic motor 15 and causes it to turn in the clockwise reverse direction so as to drive the ticket into the ramped ticket transfer aperture 100. The ticket then proceeds into the arcuate ticket guide 200 and through the printer 210 as described above, and is printed with information received from the processor.

Thus, a ticket printing and revalidation apparatus has been described. While various embodiments have been disclosed, it should be apparent that many modifications and variations of the above-described invention are possible in light of these teachings. For example, it may be possible to modify the ticket revalidation and ticket issuing procedures to include an initial ticket reading step when a ticket first passes the reading mechanism 70 wherein a security stock code number is read from a ticket and transferred to an airline central reservation information processing system. Therefore, it is to be understood that within the scope of this disclosed invention, it may be practiced other than as specifically described.

What is claimed is:

1. An apparatus for processing a ticket, comprising:
a circular ticket guide;
rotatable circular ticket guide drive means for driving a ticket in said circular ticket guide;
an arcuate ticket guide;
rotatable arcuate ticket guide drive means for driving a ticket in said arcuate ticket guide;
a ticket transfer guide extending tangentially between said circular and arcuate ticket guides for transferring a ticket between said circular and arcuate ticket guides;
at least one ticket input guide extending to said circular ticket guide for inputing a ticket into said circular ticket guide from an associated ticket input area;
a ticket output guide for outputing a ticket from said arcuate ticket guide to an associated ticket output area;
ticket reading and writing means adjacent to said circular ticket guide for electromagnetically writing information to and electromagnetically reading information from a ticket; and
ticket printing means adjacent to said arcuate ticket guide for printing visible information on a ticket.

2. The apparatus of claim 1, further including means for rotating said circular ticket guide drive means in a forward direction to input a ticket into said circular ticket guide from said at least one ticket input guide, and means for rotating said ticket drive means in a reverse direction to transfer a ticket to said ticket transfer guide.

3. The apparatus of claim 1, further including means for rotating said circular ticket guide drive means in a forward direction to input a ticket from said at least one ticket input guide, means for rotating said circular ticket guide drive means in a reverse direction to transfer a ticket through said ticket transfer guide and means for rotating said arcuate ticket guide drive means to drive a ticket from said ticket transfer guide into said arcuate ticket guide.

4. The apparatus of claim 1 wherein said at least one ticket input guide, said ticket transfer guide and said writing and reading means are respectively situated in an arcuate sequence adjacent said circular ticket guide.

5. The apparatus of claim 1 wherein said ticket transfer guide comprises ramped ticket transfer means adjacent said circular ticket guide for diverting a ticket from said circular ticket guide to said ticket transfer guide when said circular ticket guide drive means rotates in a selected direction.

6. The apparatus of claim 1 wherein said ticket transfer guide comprises ramped ticket transfer means adjacent said circular ticket guide for diverting a ticket from said circular ticket guide to said ticket transfer guide when said circular ticket guide drive means rotates in a selected direction, and wherein one of said at least one ticket input guide comprises ramped ticket return means adjacent said circular ticket guide for returning a ticket to said at least one ticket guide when said circular ticket guide drive means rotates in a selected direction.

7. The apparatus of claim 1 wherein said at least one ticket input guide comprises a first ticket feed guide extending to said circular ticket guide from a first ticket source area, a second ticket feed guide extending to said circular ticket guide from a second ticket source area, and a third ticket feed guide extending to said circular ticket guide extending from a third ticket source area.

8. The apparatus of claim 1 wherein said at least one ticket input guide comprises a first ticket feed guide extending to said circular ticket guide from a first ticket source area, a second ticket feed guide extending to said circular ticket guide from a second ticket source area, and a third ticket feed guide extending to said circular ticket guide from a third ticket source area, said first ticket guide, second ticket guide, third ticket guide, ticket transfer guide and ticket writing and reading means being respectively situated in an arcuate sequence adjacent said circular ticket guide.

9. The apparatus of claim 1 wherein said ticket transfer guide comprises ramped ticket transfer means adjacent said circular ticket guide, and wherein said at least one ticket input guide comprises a first ticket feed guide extending from a first ticket source area and a ramped ticket return adjacent said circular ticket guide, a second ticket feed guide extending from a second ticket source area, and a third ticket feed guide extending from a third ticket source area, said first ticket guide, second ticket guide, third ticket guide, ticket transfer guide, and ticket writing and reading means being respectively situated in an arcuate sequence adjacent said circular ticket guide, said apparatus further including means for rotating said circular ticket guide drive means in a forward direction to input a ticket from said first, second or third ticket input guides and said apparatus further including means for rotating said circular ticket guide drive means in a reverse direction to output a ticket through said ramped ticket transfer means to said ticket transfer guide or through said ramped ticket return means to said first ticket input guide.

10. An apparatus for processing a ticket comprising:

a housing with a circular ticket guide;

reversible drive cylinder means enclosed in said ticket guide for driving a ticket in a forward or reverse direction in said circular ticket guide;

an arcuate ticket guide;

arcuate ticket drive means for driving a ticket in said forward direction in said arcuate ticket guide;

a first ticket feed magazine in communication with said circular ticket guide for feeding a ticket into said circular ticket guide in said forward direction;

a second ticket feed magazine in communication with said circular ticket guide for feeding a ticket into said circular ticket guide in said forward direction;

ramped ticket validation means adjacent said circular ticket guide for inputting a ticket from a ticket validation input area to said circular ticket guide in said forward direction and diverting a ticket being driven in said reverse direction to said ticket validation input area;

ramped ticket transfer means adjacent said circular ticket guide for diverting a ticket being driven in said reverse direction to said arcuate ticket guide a ticket output area adjacent said arcuate ticket guide;

ticket writing and reading means adjacent said circular ticket guide for writing and reading information on a ticket being driven in said circular ticket guide; and ticket printing means adjacent said arcuate ticket guide for printing information on a ticket being driven in said arcuate ticket guide.

11. The apparatus of claim 10 wherein said arcuate ticket guide drive means comprise a first drive roller adjacent said arcuate ticket guide in communication with said ramped ticket transfer means and a print platen adjacent said arcuate ticket guide opposite said ticket printing means and in communication with said ticket output area.

12. The apparatus as set forth in claim 10 wherein said ramped ticket return means, said ramped ticket transfer means and said ticket writing means and ticket reading means are respectively situated in an arcuate sequence adjacent said circular ticket guide, and wherein said first and second ticket magazines communicate with said circular ticket guide at locations respectively situated in an arcuate sequence between said ramped ticket return means and said ramped ticket transfer means.

13. The apparatus of claim 10 wherein said ramped ticket return means and said ramped ticket transfer means include a stationary ramp having an apex which is tangential to said ticket guide, an arcuate surface which forms a portion of said circular ticket guide, and a substantially flat surface which forms said apex with said arcuate surface.

14. An apparatus for processing a ticket, comprising:

a housing with a circular ticket guide;

rotatable drive cylinder means enclosed in said circular ticket guide for driving a ticket in a forward or reverse direction in said circular ticket guide;

at least one ticket input guide extending to said circular ticket guide from a ticket input source;

an arcuate ticket guide;

arcuate ticket guide drive means for driving a ticket in said arcuate ticket guide;

a ticket transfer guide extending between said circular ticket guide and said arcuate ticket guide;

ticket writing means and ticket reading means for respectively writing electromagnetically information to and reading electromagnetic information from a ticket disposed in said circular ticket guide, said ticket writing means and ticket reading means including respective magnetic heads positioned adjacent said circular ticket guide, said at least one ticket input guide, said ticket transfer guide and said ticket writing means and ticket reading means being respectively situated in an arcuate sequence adjacent said circular ticket guide;

ticket printing means for printing visible information on a ticket, said ticket printing means including a printing head positioned adjacent said arcuate ticket guide;

ticket under magnetic head sensor means arcuately positioned with said ticket writing means for generating a ticket under magnetic head (TUM) signal in response to a ticket adjacent said ticket writing means; and control means for selectively activating said ticket writing means and/or said ticket reading means in response to an input from said ticket under magnetic head sensor means, while controlling said rotatable drive cylinder means to rotate in said forward direction, and for thereafter controlling said rotatable drive cylinder means to rotate in said reverse direction after terminating activation of said ticket writing means and/or said ticket reading means.

15. The apparatus of claim 14 wherein said control means include:

first control means for controlling said drive cylinder means to rotate in said forward direction to drive a ticket in a forward direction in said circular ticket guide a predetermined amount to place a trailing edge of a ticket relative to said forward direction beyond one of said at least one ticket input guide;

second control means for controlling said drive cylinder means to rotate in said reverse direction: and said ticket input guide having ramped ticket return means adjacent said circular ticket guide for diverting a ticket from said circular ticket guide toward a ticket input source as a ticket is driven in said reverse direction by said drive cylinder means.

16. The apparatus of claim 14 wherein said control means include:

first control means for controlling said rotatable drive cylinder means to rotate in said forward direction to drive a ticket in said forward direction in said circular ticket guide, while activating said ticket writing means and/or said ticket reading means; and second control means for thereafter controlling said rotatable drive cylinder means to rotate in said reverse direction to drive a ticket in said reverse direction in said circular ticket guide; and said ticket transfer guide having ramped ticket transfer means adjacent said circular ticket guide for diverting a ticket from said circular ticket guide into said arcuate ticket guide as a ticket is driven in said reverse direction by said drive cylinder means.

17. The apparatus of claim 14 further including transition sensor means adjacent said ticket transfer guide for sensing a ticket in said ticket transfer guide, and ticket under print head sensor means arcuately positioned adjacent said ticket printing means for sensing a ticket under said ticket printing means, said transition sensor means and said ticket under print head sensor means being connected to said control means to provide ticket location inputs to said control means, said control means also being connected to said arcuate ticket guide drive means for selectively controlling said arcuate ticket guide drive means to rotate in said forward direction.

18. The apparatus of claim 17 wherein said control means include:

first control means for controlling said rotatable drive cylinder means to rotate in said forward direction to drive a ticket in said forward direction in said circular ticket guide while activating said ticket writing means and/or said ticket reading means;

second control means for thereafter controlling said rotatable drive cylinder means to rotate in said reverse direction to drive a ticket in said reverse direction in said circular ticket guide, said ticket transfer guide having ramped ticket transfer means adjacent said circular ticket guide for diverting a ticket from said circular ticket guide into said arcuate ticket guide as a ticket is driven in said reverse direction by said rotatable drive cylinder means;

third control means for thereafter activating said arcuate ticket guide drive means to drive a ticket in said ticket forward direction when said transition sensor senses a ticket in said ticket transfer guide;

fourth control means for thereafter deactivating said rotatable drive cylinder means when said ticket under print head sensor senses a ticket under said ticket printing means; and fifth control means for thereafter deactivating said arcuate ticket drive means when said ticket under print head sensor senses that a ticket has passed beyond said ticket under print head sensor.

19. A method for processing tickets using an apparatus having a circular ticket guide, means for selectively driving a ticket in a forward or a reverse direction in said circular ticket guide, writing and reading means adjacent said circular ticket guide for writing and reading information on a ticket in said circular ticket guide, an arcuate ticket guide, arcuate ticket guide drive means for driving a ticket in said forward direction in said arcuate ticket guide, ticket printing means disposed adjacent said arcuate ticket guide drive means for printing information on a ticket in said arcuate ticket guide, a ticket transfer guide extending tangentially between said circular ticket guide and said arcuate ticket guide, ramped ticket return means for diverting a ticket being driven in said reverse direction in said circular ticket guide to a ticket input source area, and ramped ticket transfer means for diverting a ticket being driven in said reverse direction in said circular ticket guide to said ticket transfer guide, the method comprising the steps of:

feeding a ticket into said circular ticket guide and driving said ticket in a said forward direction in said circular ticket guide past said ticket writing and reading means;

writing information to and/or reading information from said ticket while it is being driven past said writing and reading means in said forward direction; and driving said ticket in said reverse direction while diverting said ticket from said circular ticket guide at a selected one of said ramped ticket return means or ramped ticket transfer means to transfer said ticket to either said ticket input source area or said ticket printing means.

20. The method of claim 19 wherein said ticket is diverted from said circular ticket guide to said ramped ticket return means for transfer to said ticket input source area.

21. The method of claim 19 wherein said ticket is diverted from said circular ticket guide to said ramped ticket transfer means for transfer to said arcuate ticket guide, said method further including the steps of:

driving said ticket in said forward direction in said arcuate ticket guide past said ticket printing means;

printing information on said ticket while it is being driven past said ticket printing means; and outputting said ticket to a ticket output area.

22. The method of claim 19 further including the step of initially reading a security code from said ticket while said ticket is being driven in said forward direction in said circular ticket guide.

23. A method for processing tickets comprising the steps of:

introducing a ticket into a first endless ticket path;

driving said ticket around said first ticket path in a forward direction;

selectively writing magnetic information to and/or reading magnetic information from said ticket while said ticket is being driven in said forward direction in said ticket path;

driving said ticket in a reverse direction while diverting said ticket to a second ticket path from said first ticket path at a ticket diverting point;

transferring said ticket from said second ticket path to a third ticket path;

driving said ticket in said third ticket path; and selectively printing visible information on said ticket while said ticket is being driven on said third ticket path.

24. The method of claim 23 wherein said ticket is diverted to a ticket return area.

25. The method of claim 23 wherein said ticket is diverted to a second ticket path, said method further including the steps of:

driving said ticket in said second ticket path;

printing information on said ticket as it is being driven around said second ticket path; and outputting said ticket to a ticket output area.

26. The method of claim 23 further including the step of initially reading a security code from said ticket while it is being driven in said forward direction in said first ticket path.

27. An apparatus for processing a ticket comprising:

a housing with a circular ticket guide;

rotatable drive cylinder means enclosed in said circular ticket guide for driving a ticket in a forward or reverse direction in said circular ticket guide;

a ticket input source;

at least one ticket input guide extending to said circular ticket guide from said ticket input source;

an arcuate ticket guide;

arcuate ticket guide drive means for driving a ticket in said arcuate ticket guide;

a ramped ticket transfer guide extending between said circular ticket guide and said arcuate ticket guide for diverting a ticket from said circular ticket guide into said arcuate ticket guide as a ticket is driven in said reverse direction by said rotatable drive cylinder means;

ticket writing means and ticket reading means for respectively writing electromagnetic information to and reading electromagnetic information from a ticket in said circular ticket guide, said ticket writing means and ticket reading means including respective magnetic heads positioned adjacent to said circular ticket guide, said at least one ticket input guide;

said ticket transfer guide and said ticket writing means and ticket reading means being respectively situated in an arcuate sequence adjacent said circular ticket guide;

ticket printing means for printing visible information on a ticket, said ticket printing means including a printing head positioned adjacent to said arcuate ticket guide;

ticket under magnetic head sensor means arcuately positioned with said ticket writing means adjacent said circular ticket guide for generating a ticket under magnetic head (TUM) signal in response to a ticket adjacent said ticket writing means;

transition sensor means positioned adjacent said ticket transfer guide for generating a ticket transfer signal in response to a ticket in said ticket transfer guide;

ticket under print head sensor means arcuately positioned with said ticket printing means adjacent said arcuate ticket guide for generating a ticket under print head (TUP) signal in response to a ticket under said ticket printing means; and a control assembly connected to said rotatable drive cylinder means, said arcuate ticket guide drive means, said ticket writing means, said ticket reading means, said ticket under magnetic head sensor means, said transition sensor means, said ticket printing means and said ticket under magnetic head print sensor means, said control assembly including:

first control means responsive to a user-generated control signal for controlling said rotatable drive cylinder means to rotate in said forward direction to input a ticket from said ticket source and to drive a ticket in said forward direction in said circular ticket guide while activating said ticket writing means and/or said ticket reading means;

second control means responsive to said TUM signal changing from an "on" state to an "off" state for thereafter controlling said rotatable drive cylinder means to rotate in said reverse direction to drive a ticket in said reverse direction in said circular ticket guide through said ramped ticket transfer means and into said ticket transfer guide;

third control means responsive to said ticket transfer signal changing from an "off" state to an "on" state and said TUM signal changing from an "on" state to an "off" state for thereafter activating said arcuate ticket guide drive means to input a ticket from said ticket transfer guide into said arcuate ticket guide and to drive a ticket in said forward direction in said arcuate ticket guide;

fourth control means responsive to said TUP signal changing from an "off" state to an "on" state for thereafter deactivating said rotatable drive cylinder means; and fifth control means responsive to said TUP signal changing from an "on" state to an "off" state for thereafter deactivating said arcuate ticket drive means.

28. A ticket processing system, comprising:

a magnetic read/write system for reading and writing magnetic information on a ticket, including:

an endless read/write processing path;

data write means adjacent said read/write processing path for writing magnetic data on a ticket;

data read means adjacent said read/write processing path for reading magnetic data on a ticket;

drive means for driving a ticket in said read/write processing path in a forward and a reverse direction;

ticket input/output means for inputing a ticket from an input to said read/write processing path in said forward direction and for outputing a ticket from said read/write processing path to an output in said reverse direction;

read/write process control means responsive to the position of a ticket in said endless read/write processing path for controlling said magnetic read/write system to input a ticket to said read/write processing path, to magnetically write and/or read data on the ticket and to output the ticket from said read/write processing path;

a ticket printing assembly for printing visible information on a ticket, including:

a printing processing path;

printing means disposed adjacent said printing processing path;

drive means for driving a ticket in said printing processing path;

ticket input/output means for inputing a ticket from an output of said read/write processing path to said printing processing path and for outputing a ticket from said printing processing path to a ticket output; and printing process control means responsive to the outputing of a ticket from said read/write processing system and to the position of a ticket in said printing processing path for controlling said ticket printing system to input a ticket to said printing processing path. to print visible information on the ticket and to output the ticket from said printing processing path.

* * * * *